United States Patent
Bergerhoff et al.

[11] 3,886,179
[45] May 27, 1975

[54] ORGANIC PHOSPHORUS COMPOUNDS CONTAINING AT LEAST ONE PHOSPHORUS ATOM, WHICH MAY BE PRESENT IN THE TRIVALENT STATE, AT LEAST TWO CARBOXYLIC ACID-ESTER GROUPS AND A PHOSPHORUS TO CARBON DOUBLE LINKAGE

[75] Inventors: Gunter Bergerhoff, Lengsdorf; Bela Tihanyi, Bonn; Jurgen Falbe, Dinslaken; Jurgen Weber; Werner Weisheit, both of Oberhausen-Holten, all of Germany

[73] Assignee: Ruhrchemie Aktiengesellschaft, Oberhausen-Holten, Germany

[22] Filed: May 8, 1972

[21] Appl. No.: 250,897

Related U.S. Application Data

[63] Continuation-in-part of Ser. No. 772,841, Nov. 1, 1968, Pat. No. 3,681,477.

[30] Foreign Application Priority Data
Nov. 7, 1967  Germany............................ 1668623
July 15, 1968  Austria ............................ 66801/68

[52] U.S. Cl... 260/326.25; 260/246 B; 260/332.2 A; 260/346.2 M; 260/551 P; 260/468 J; 252/397
[51] Int. Cl............................................ C07d 105/00
[58] Field of Search ..................... 260/326.25, 468 J

[56] References Cited
UNITED STATES PATENTS
3,488,732  1/1970  Heiba et al. .................... 260/927 X

*Primary Examiner*—Joseph A. Narcavage
*Attorney, Agent, or Firm*—Burgess, Dinklage & Sprung

[57] ABSTRACT

The disclosed compounds include derivatives of 1,2-di-phosphacyclopentene-(5)-one-(4) having the formula:

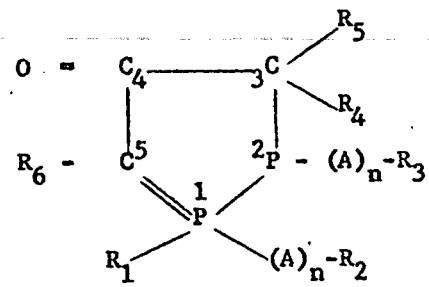

wherein $R_1$ represents an aliphatic, cycloaliphatic, heterocyclic or aromatic radical linked to the nucleus via an oxygen atoms, $R_2$ and $R_3$ each represent aliphatic, cycloaliphatic, heterocyclic or aromatic radicals, which may be linked to the nucleus via a bridge atom A selected from the group of oxygen, sulfur, nitrogen, and phosphorus, $n$ is an integer having a value of 0 or 1 if the bridge atom is oxygen, and if the bridge atom is sulfur, nitrogen or phosphorus $n$ has a value of 0, 1 or 2, and $R_4$, $R_5$ and $R_6$ each stand for a carboxylic acid ester group.

3 Claims, No Drawings

ORGANIC PHOSPHORUS COMPOUNDS CONTAINING AT LEAST ONE PHOSPHORUS ATOM, WHICH MAY BE PRESENT IN THE TRIVALENT STATE, AT LEAST TWO CARBOXYLIC ACID-ESTER GROUPS AND A PHOSPHORUS TO CARBON DOUBLE LINKAGE

This application is a continuation-in-part of application Ser. No. 772,841, filed Nov. 1, 1968, now U.S. Pat. No. 3,681,477.

This invention relates to novel organic phosphorus compounds, which contain at least one phosphorus atom which may be present in the trivalent state, at least two carboxylic acid-ester groups and a phosphorus to carbon double linkage in their molecule and to a method of preparing the same.

In copending U.S. Pat. application Ser. No. 765,687, filed Oct. 7, 1968, now U.S. Pat. No. 3,681,435, there is described the reaction of malonic acid diethylester with phenylphosphine dichloride in the presence of a basic reacting material and preferably in the presence of an organic solvent. The resulting phosphorus compound is advantageously separated from the hydrohalogenide of the base by fractional crystallization or extraction.

In accordance with the present invention it has been found that not only the two individual compounds hereinbefore mentioned can be reacted, but that other malonic acid diesters and other compounds of trivalent phosphorus can be successfully reacted to form a novel group of compounds.

It thus has been found according to the invention that novel organic phosphorus compounds, containing at least one phosphorus atom, which may be present in the trivalent state, at least two carboxylic acid ester groups and a phosphorus to carbon double linkage may be prepared by reacting a malonic acid diester with a compound of trivalent phosphorus having directly linked to the phosphorus atom at least two halogen atoms capable of reacting with activated hydrogen atoms preferably in the presence of an organic solvent. The reaction of malonic acid diethylester with phenyl phosphine dichloride described in copending application Ser. No. 765,687 and the reaction product thereof is excluded from the scope of the instant invention.

The malonic acid diesters suitable for use in the process of the invention include esters of aliphatic, cycloaliphatic, heterocyclic and aromatic alcohols, wherein the aliphatic alcohols employed as esterification components preferably contain 1 to 20 carbon atoms. Cycloaliphatic alcohols containing 5 to 20 carbon atoms are particularly valuable as ester constituents, while heterocyclic alcohols having up to 20 carbon atoms and aromatic alcohols having 6 to 20 carbon atoms are preferred.

The hydrogen halide evolved during the conversion is advantageously continuously removed from the reaction mixture by reaction with basic reacting materials. According to a specific embodiment of the invention, the hydrogen halide can also be continuously removed from the reaction mixture by introduction of inert gases.

The reaction is preferably carried out in a reaction medium, which dissolves the starting materials but in which the reaction product is not soluble. Hexane has proved to be particularly well suited for this purpose. If a solvent reaction medium is used, it is removed after completion of the reaction by the conventional method. The remaining residue is extracted with a suitable solvent, preferably benzene, from which the resulting phosphorus compound can then be easily isolated.

According to another embodiment of the invention the reaction is carried out in a solvent, which acts to dissolve the starting material as well as the novel phosphorus compound produced in the reaction. When this latter procedure is followed, for instance when benzene is used as solvent, the precipitated hydrohalogenide of the base is separated off, washed and the resulting phosphorus compound isolated from the solution thereby obtained by evaporation and recrystallization.

The reaction may be advantageously carried out at a temperature of from about −80°C up to about +60°C. Higher temperatures should only be used in particular instances, as such higher temperatures often lead to undesirable detours in the reaction course and in several cases favor the formation of undesired side products. Temperatures of between 0° and 60°C, preferably of between 40° and 60°C, are most conveniently used for carrying out the reaction. The use of increased pressure appears, other than in special instances, to be unnecessary.

If basic acting materials are to be used as acceptors for the hydrogen halide evolved in the reaction, tertiary amines, as for instance, triethylamine or tributylamine are preferred. The basic acting material is generally used in an amount sufficient for the bonding of two moles of hydrogen halide.

Although the ratio of the malonic acid diester to the halogen-phosphorus compound is not critical, it is preferred to react the malonic acid diester to the halogen phosphorus components in a molar ratio of 1:1. It has been found to be advantageous to first mix the malonic acid-diester and the base used for bonding the evolved hydrogen halide and thereafter to add the halogen-phosphorus compound to the resulting mixture in a dropwise fashion. According to another suitable procedure the base is introduced into a mixture of the malonic acid-diester and the halogen-phosphorus compound in a dropwise fashion.

In accordance with the invention as phosphorus compound, there are preferably used compounds of trivalent phosphorus containing directly linked to the phosphorus atom at least two halogen atoms capable of reacting with activated hydrogen atoms corresponding to the formula:

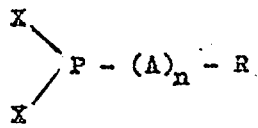

wherein each X represents halogen, preferably chlorine, bromine or iodine, whereby the two X may be the same or different, R represents an aliphatic, cycloaliphatic, heterocyclic or aromatic radical, which may be substituted, the substituent being required to be non-reacting with the halogen atoms linked to the phosphorus atom under reaction conditions, A represents a bridge atom and namely one of oxygen, sulfur, nitrogen and phosphorus, $n$ is an integer having a value of 0 or 1 where the bridge atom is oxygen, and 0,1 or 2 where the bridge atom is sulfur, nitrogen or phosphorus.

The organic phosphorus compounds prepared according to the process of the invention contain at least one phosphorus atom, which may be present in the trivalent state, a phosphorus to carbon double linkage and at least two carboxylic acid ester groups. They are obtained by reaction of malonic acid-diesters in the presence of a base with compounds of trivalent phosphorus represented by the formula:

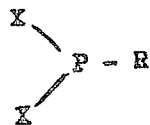

wherein each X represents halogen, preferably chlorine, bromine or iodine, wherein the two X may be the same or different, R represents an aliphatic, cycloaliphatic, heterocyclic or aromatic radical, which may be substituted, by a substituent which is non-reacting with the halogen atoms linked to the phosphorus atom.

The group of the novel phosphorus compounds also includes phosphorus compounds, which are obtained by reaction of malonic acid-diester in the presence of a basic reacting material with a compound of trivalent phosphorus represented by the formula:

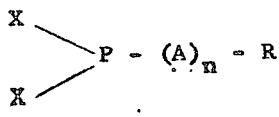

wherein X and R have the significance as set out above, A represents a bridge atom selected from the group of oxygen, sulfur, nitrogen and phosphorus, n is an integer having a value of 1 or 2 where the bridge atom is sulfur, nitrogen or phosphorus.

The novel phosphorus compounds of the invention can also contain, in addition to a phosphorus atom, which may be present in the trivalent state, a phosphorus to carbon double linkage and at least two carboxylic acid ester groups, a second phosphorus atom.

In this case, one phosphorus atom can be present in the trivalent state and one phosphorus atom in the penta-valent state and a phosphorus to carbon double linkage can be present at the penta-valent atom.

In accordance with the invention the trivalent as well as the penta-valent phosphorus atom can carry substituents, which may be aliphatic, cycloaliphatic, heterocyclic or aromatic radicals which may be substituted, the substituents being nonreacting with the halogen atoms linked to the phosphorus atom under the prevailing reaction conditions.

Further in accordance with the invention it has been found that in the novel organic phosphorus compounds containing at least one phosphorus atom, which may be present in the trivalent state, at least two carboxylic acid ester groups, a second phosphorus atom, which may be present in the penta-valent state and a phosphorus to carbon double linkage at the penta-valent phosphorus atom, a phosphorus to phosphorus linkage between the trivalent and the penta-valent phosphorus atom is possible, wherein the trivalent as well as the penta-valent phosphorus atom can carry substituents, which may be aliphatic, cycloaliphatic, heterocyclic or aromatic radicals, which in their turn may be substituted by substituents non-reactive with the halogen atoms linked to the phosphorus.

In this instance the trivalent as well as the penta-valent phosphorus atom may be part of a five-membered heterocyclic ring.

Included within the scope of the novel compounds of the invention are the derivatives of 1,2-diphosphacyclopentene-(5)-one-(4) having the formula:

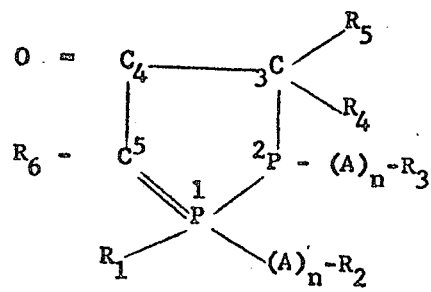

wherein $R_1$ represents an aliphatic, cycloaliphatic, heterocyclic or aromatic radical linked to the nucleus via an oxygen atom, $R_2$ and $R_3$ each represent aliphatic, cycloaliphatic, heterocyclic or aromatic radicals, which may be linked to the nucleus via a bridge atom A selected from the group of oxygen, sulfur, nitrogen, and phosphorus, n is an integer having a value of 0 or 1 if the bridge atom is oxygen and if the bridge atom is sulfur, nitrogen or phosphorus n has a value of 0,1 or 2, and $R_4$, $R_5$ and $R_6$ each stand for a carboxylic acid ester group.

Due to the presence of a phosphorus atom having a pair of free electrons, the aforesaid compounds are electron donors and therefore are capable of forming complexes with transition metals and compounds of the latter.

The novel compounds prepared by the process of the invention have proved useful as pest controlling agents, as catalyst components as well as intermediates for use in organic-technical synthesis reactions as for instance the complexing reactions just noted.

Of particular importance is the oxidation inhibiting efficiency of the novel compounds, as is seen from the following comparison.

EXAMPLE A

Through 163.3 g n-butyraldehyde, containing dissolved 3.26 g 1-tert.-butoxy-1,2-di-(4'-dimethylaminophenyl)-[1,2-diphospha-cyclopentene-(5)-one-(4)]-tricarboxylic acid-(3,3,5)-tri-tert.-butylester were passed 54 Nl air during one hour at ambient temperature.

n-butyric acid formed:

after 30 minutes 0.33 g
after 60 minutes 0.46 g

EXAMPLE B

Through 163.3 g n-butyraldehyde, containing dissolved 3.26 g 1-methoxy-1,2-di-(4'-dimethylaminophenyl)-[1,2-diphospha-cyclopentene-(5)-one-(4)]-tricarboxylic acid-(3,3,5)-trimethylester, were passed 54 Nl air during one hour at ambient temperature.

n-butyric acid formed:

after 30 minutes 1.05 g
after 60 minutes 1.21 g

EXAMPLE C

Through 163.3 g n-butyraldehyde containing none of the novel phosphorus compounds of the invention were passed 54 Nl air during one hour at ambient temperature.

n-butyric acid formed:

after 30 minutes 17.7 g
after 60 minutes 34.1 g

For instance a novel phenyl-substituted phosphorus compound is formed with favorable results if malonic acid diethylester is reacted with phenylphosphine dichloride in presence of a base preferably in an organic solvent and the phosphorus compound thereby formed is separated from the hydrochloric acid salt of the base by fractional crystallisation or extraction. Thereby the chemical compound 1-ethoxy-1,2-diphenyl-[1,2-diphospha-cyclopentene-(5)-one-(4)]-tricarboxylic acid-(3,3,5)-triethylester is formed.

This phenylsubstituted phosphorus compound proved especially useful as catalyst component.

Furthermore of particular importance is the oxidation inhibiting efficiency as is seen from the following comparison:

Through 159.5 g n-butyraldehyde were passed 31 l air during 30 minutes, whereby 15.6 g butyric acid were formed.

Under similar conditions but with addition of 3.2 g of 1-ethoxy-1,2-diphenyl-[1,2-diphospha-cyclopentene-(5)-one-(4)]-tricarboxylic acid-(3,3,5)-triethylester only 2 g butyric acid were formed.

Melting point of the compound: 114°C. The compound is soluble in benzene, acetone, acetic acid ethylester, but difficult to dissolve in benzine, ether, alcohol.

It shows the adsorption bands at:

| | |
|---|---|
| 692 cm$^{-1}$ | 1305 cm$^{-1}$ |
| 717 do. | 1362 do. |
| 744 do. | 1390 do. |
| 757 do. | 1442 do. |
| 768 do. | 1635 do. |
| 958 do. | 1735 do. |
| 1025 do. | 1765 do. |
| 1112 do. | 3000 do. |
| 1230 do. | |

EXAMPLE 1

202 g triethylamine were added to a solution of 213 g p-chlorophenylphosphine dichloride and 160 g malonic acid-diethylester in 1000 ml benzene, dropwise under stirring at a temperature of 50°C. The mixture was stirred for a further two hours, precipitated triethylamine hydrochloride was separated off by filtration. The remaining filtrate was evaporated, whereby colorless crystals were formed which were washed with ether and recrystallized from absolute methylalcohol.

| | | | | |
|---|---|---|---|---|
| Melting point | : 114 to 115°C | | | |
| Yield | : 190 g | | | |
| Analysis : | | | | |
| $C_{28}H_{28}O_8P_2Cl_2$ | C | H | Cl | P |
| Calc. | 51.9 | 4.66 | 11.8 | 10.3 |
| Det. | 50.69 | 4.72 | 12.20 | 11.93 |
| Molecular weight : (vapor pressure-osmometric determined) | | | | |
| Calc. 601  det. 558 | | | | |

EXAMPLE 2

35 g N-methylaniline-N-phosphine dichloride and 27 g malonic acid-diethylester were dissolved in 330 ml benzene. 38 g triethylamine were then added to the resulting solution under a blanket of nitrogen at 50°C. The reaction mixture was stirred for two hours and the precipitated triethylamine hydrochloride was separated off by filtration. The filtrate was concentrated to about one third of its volume and 330 ml absolute ether added thereto. A highly viscous liquid was separated by stratification and was decanted from the ether.

| | | | | |
|---|---|---|---|---|
| Yield : 43 g | | | | |
| Analysis : | | | | |
| $C_{28}H_{36}O_8P_2N_2$ | C | H | N | P |
| Calc. | 56.9 | 6.1 | 4.75 | 10.5 |
| Det. | 56.10 | 7.14 | 4.50 | 9.30 |
| Molecular weight : (vapor pressure-osmometric determined) | | | | |
| Calc. 590  Det. 543 | | | | |

EXAMPLE 3

19.3 g p-tolyl-phosphine dichloride and 16.2 g malonic acid diethylester were dissolved in 200 ml benzene. A solution of 20.2 g triethylamine in 100 ml benzene was added thereto at 50°C in a nitrogen atmosphere under stirring. After two hours any precipitated triethylamine hydrochloride was separated off by suction and the resulting filtrate concentrated. The colorless crystals which remain, were washed with ether and recrystallized from absolute methylalcohol.

| | | | |
|---|---|---|---|
| Melting point | : 114°C | | |
| Yield | : 15.4 g | | |
| Analysis : $C_{28}H_{34}O_8P_2$ | C | H | P |
| Calc. | 60.0 | 6.12 | 11.05 |
| Det. | 59.40 | 6.27 | 10.88 |
| Molecular weight : | (vapor pressure-osmometric determined) | | |
| Calc. 560  Det. 508 | | | |

The individual chemical compounds prepared on the basis of examples 1 to 4 are designated in the attached Table by the following numbers:

Example 1 = 2
Example 2 = 8
Example 3 = 3

The additional compounds listed in the tables were prepared as hereinafter indicated: 0.2 mols triethylamine were added to about 0.1 mol of the compounds as set out in column 1 of the table, dissolved in about a five fold amount by weight benzene, dropwise under a nitrogen atmosphere at 50°C with stirring. Thereafter the reaction mixture was stirred for two hours and the precipitated triethylamine hydrochloride separated off by filtration. The solvent was distilled off and the remaining reaction product either washed with ether and recrystallized from absolute methyl alcohol or, if it was a liquid, purified according to conventional methods.

TABLE

| | Reactants | Sum formula | Reaction Products Analysis | | | | | | | | | | | Chemical designation |
|---|---|---|---|---|---|---|---|---|---|---|---|---|---|---|
| | | | Calcd. | | | | | | Det. | | | | | |
| | | | C | H | P | N | Cl | MG | C | H | P | N | Cl | MG | |
| 1 | Phenylphosphine dichloride plus malonic acid diethylester. | $C_{26}H_{30}O_8P_2$ | 58.6 | 5.64 | 11.64 | | | 532 | 58.20 | 5.92 | 11.69 | | | 532 | 1-ethoxy-1,2-diphenyl-[1,2-diphospha-cyclopentene-(5)-one-(4)]-tricarboxylic acid-(3,3,5)-triethylester. |
| 2 | p-Chloro-phenyl-phosphine-dichloride plus malonic acid diethylester. | $C_{26}H_{28}O_8P_2Cl_2$ | 51.9 | 4.66 | 10.30 | | 11.8 | 601 | 50.69 | 4.72 | 11.93 | | 12.20 | 558 | 1-ethoxy-1,2-di-(4'-chlorophenyl)-[1,2-diphospha-cyclopentene-(5)-one-(4)]-tricarboxylic acid-(3,3,5)-triethylester. |
| 3 | p-Tolyl-phosphine-dichloride plus malonic acid diethylester. | $C_{28}H_{34}O_8P_2$ | 60.0 | 6.12 | 11.05 | | | 560 | 59.40 | 6.27 | 10.88 | | | 508 | 1-ethoxy-1,2-di-(4'-methylphenyl)-[1,2-diphospha-cyclopentene-(5)-one-(4)]-tricarboxylic acid-(3,3,5)-triethylester. |
| 4 | p-Dimethylamino-phenyl-phosphine dichloride plus malonic acid-diethylester. | $C_{30}H_{40}O_8P_2N_2$ | 58.25 | 6.47 | 10.05 | 4.53 | | 618 | 58.55 | 6.82 | 9.65 | 4.69 | | 578 | 1-ethoxy-1,2-di-(4'-dimethylamino-phenyl)-[1,2-diphospha-cyclopentene-(5)-one-(4)]-tricarboxylic acid-(3,3,5)-triethylester. |
| 5 | p-Fluoro-phenyl-phosphine dichloride plus malonic acid diethylester. | $C_{26}H_{28}O_8P_2F_2$ | 54.93 | 4.93 | 10.90 | | | 568 | 54.45 | 4.60 | 9.85 | | | 530 | 1-ethoxy-1,2-di-(4'-fluorophenyl)-[1,2-diphospha-cyclopentene-(5)-one-(4)]-tricarboxylic acid-(3,3,5)-triethylester. |
| 6 | o-Tert.-butyl-phenoxy-phosphine dichloride plus malonic acid-diethylester. | $C_{34}H_{46}O_{10}P_2$ | 60.4 | 6.8 | 9.17 | | | 676 | 61.20 | 6.65 | 8.49 | | | 508 | 1-ethoxy-1,2-di-(2'-tert.-butyl-phenoxy)-[1,2-diphospha-cyclopentene-(5)-one-(4)]-tricarboxylic acid-(3,3,5)-triethylester. |
| 7 | 2,5-dimethyl-phenylphosphine dichloride plus malonic acid diethylester. | $C_{30}H_{38}O_8P_2$ | 61.2 | 6.46 | 10.55 | | | 588 | 61.40 | 6.55 | 10.44 | | | 496 | 1-ethoxy-1,2-di-(2',5'-dimethylphenyl)-[1,2-diphospha-cyclopentene-(5)-one-(4)-tricarboxylic acid-(3,3,5)-triethylester. |
| 8 | N-methylaniline-N-phosphine dichloride plus malonic acid-diethylester. | $C_{28}H_{36}O_8P_2N_2$ | 56.9 | 6.10 | 10.5 | 4.75 | | 590 | 56.10 | 7.14 | 9.30 | 4.50 | | 543 | 1-ethoxy-1,2-di-(N-methylanilino)-[1,2-diphospha-cyclopentene-(5)-one-(4)]-tricarboxylic acid-(3,3,5)-triethylester. |
| 9 | Phenylphosphine dichloride plus malonic acid dimethylester. | $C_{22}H_{22}O_8P_2$ | 55.45 | 4.62 | 13.02 | | | 476 | 55.0 | 4.80 | 12.47 | | | 476 | 1-methoxy-1,2-diphenyl-[1,2-diphospha-cyclopentene-(5)-one-(4)]-tricarboxylic acid-(3,3,5)-trimethylester. |
| 10 | Phenylphosphine dichloride plus malonic acid di-tert.-butylester. | $C_{34}H_{46}O_8P_2$ | 63.4 | 7.14 | 9.62 | | | 644 | 62.7 | 7.34 | 9.23 | | | 593 | 1-tert.-butoxy-1,2-diphenyl-[1,2-diphospha-cyclopentene-(5)-one-(4)]-tricarboxylic acid-(3,3,5)-tri-tert.-butylester. |
| 11 | p-Dimethylamino-phenylphosphine-dichloride plus malonic acid-di-tert.-butylester. | $C_{38}H_{56}O_8P_2N_2$ | 62.47 | 7.67 | 8.49 | 3.84 | | 730 | 62.46 | 8.07 | 8.26 | 4.40 | | 638 | 1-tert.-butoxy-1,2-di-(4'-dimethylamino-phenyl)-[1,2-diphospha-cyclopentene-(5)-one-(4)]-tricarboxylic acid-(3,3,5)-tri-tert.-butylest. |
| 12 | Ethylphosphine dichloride plus malonic acid-diethylester. | $C_{18}H_{30}O_8P_2$ | 49.05 | 6.88 | 14.21 | | | 436 | 50.45 | 7.04 | 13.70 | | | 392 | 1-ethoxy-1,2-diethyl-[1,2-diphospha-cyclopentene-(5)-one-(4)]-tricarboxylic acid-(3,3,5)-triethylester. |
| 13 | n-Butyl-phosphine-dichloride plus malonic acid-diethylester. | $C_{22}H_{38}O_8P_2$ | 53.6 | 7.73 | 12.6 | | | 492 | 52.6 | 7.40 | 11.80 | | | 405 | 1-ethoxy-1,2-di-n-butyl-[1,2-diphospha-cyclopentene-(5)-one-tricarboxylic acid-(3,3,5)-triethylester. |

| Reactants | Sum Formula | Chemical designation |
|---|---|---|
| 14) Pyrrolidine-N-dichloro-phosphine + malonic-acid-diethylester | $C_{22}H_{36}O_8H_2P_2$ | 1-ethoxy-1,2-di-(N-prrolidyl)-[1,2-disphospha-cyclopentene-(5)-one-(4)]-tricarboxylic-acid-(3,3,5)-triethylester |
| 15) Morpholine-N-dichloro-phosphine + malonic acid-diethylester | $C_{22}H_{36}O_{10}N_2P_2$ | 1-ethoxy-1,2-di(N-morpholino)-[1,2-diphospha-cyclopentene-(5)-one-(4)]-tricarboxylic acid-(3,3,5)-triethylester |
| 16) 2-thienyl-dichloro-phosphine + malonic acid diethylester | $C_{22}H_{26}O_8P_2S_2$ | 1-ethoxy-1,2-di-(2'-thienyl)-[1,2-diphospha-cylopentene-(5)-one-(4)]-tricarboxylic acid-(3,3,5)-triethylester |
| 17) Dibenzofurane-3-dichloro-phosphine + malonic acid diethylester | $C_{38}H_{34}O_{10}P_2$ | 1-ethoxy-1,2-di-(3'-dibenzofuryl)-[1,2-di-phospha-cyclopentene-(5)-one-(4)]-tricarboxylic acid-(3,3,5)-triethyl-ester |

| | | C | H | Analyses P | N | Cl | S | MG |
|---|---|---|---|---|---|---|---|---|
| 14.) | calculated | 50.96 | 7.00 | 11.95 | 5.40 | — | — | 518 |
| | found | 51.20 | 8.90 | 11.40 | 5.80 | — | — | 480 |
| 15.) | calculated | 47.99 | 6.59 | 11.25 | 5.09 | — | — | 551 |
| | found | 48.32 | 7.95 | 11.50 | 5.00 | — | — | 490 |
| 16.) | calculated | 48.52 | 4.81 | 11.37 | — | — | 11.77 | 545 |
| | found | 47.95 | 4.90 | 11.10 | — | — | | 487 |
| 17.) | calculated | 64.05 | 4.81 | 8.69 | — | — | — | 713 |
| | found | 63.80 | 4.70 | 8.80 | — | — | — | 683 |

A list of several intensive adsorption bands in the IR-spectrum [cm$^{-1}$] of the compounds quoted in the table and the respective melting points for some of these compounds (where solid products are involved) are hereinafter set out.

| | INTENSIVE ADSORPTION BANDS IN THE IR-SPECTRUM [cm$^{-1}$] | MELTING POINT [°C] | |
|---|---|---|---|
| 1. | 1765; 1735; 1635; 1442 | — | 114 | — |
| 2. | 1755; 1720; 1640; 1445 | 114.5 | — | 115 |
| 3. | 1755; 1725; 1640; 1440 | — | 114 | — |
| 4. | 1740; 1710; 1620; 1445 | 120 | — | 121 |
| 5. | 1765; 1725; 1640; 1450 | 75 | — | 85 |
| 6. | 1750; 1725; 1655; 1440 | — | — | — |
| 7. | 1760; 1710; 1630; 1440 | 125 | — | 126 |
| 8. | 1740; 1710; 1650; — | — | — | — |
| 9. | 1770; 1710; 1635; 1435 | 126 | — | 130 |
| 10. | 1755; 1730; 1630; 1440 | 98 | — | 100 |
| 11. | 1750; 1710; 1640; 1450 | 105 | — | 106 |
| 12. | 1750; 1725; 1650; — | — | — | — |
| 13. | 1740; 1715; 1610; — | — | — | — |
| 14. | 1765; 1720; 1630; 1440 | — | — | — |
| 15. | 1770; 1725; 1630; 1435 | — | — | — |
| 16. | 1750; 1710; 1630; 1430 | — | — | — |
| 17. | 1765; 1710; 1625; 1425 | — | — | — |

In the products, $R_2$ or $R_3$ or both $R_2$ and $R_3$ can be heterocyclic. $R_2$ and $R_3$ can be the same or different. Preferably the heterocyclic ring contains up to 6 carbon atoms.

Phosphene reactants Nos. 16 and 17 of the tables above are of the following formulae:

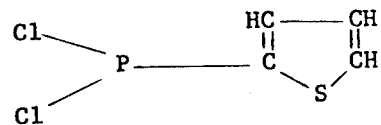

2-thienyl-dichloro-phosphine

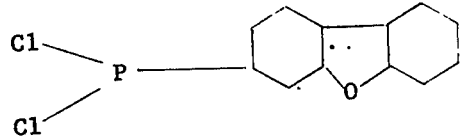

dibenzofurane-3-dichloro-phosphine.

What is claimed is:
1. 1,2-diphosphacyclopentene-(5)-one-(4) of the formula:

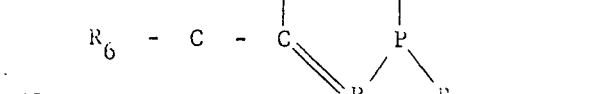

wherein:
  $R_1$, $R_2$, $R_5$ and $R_6$ is each an alkoxy group of 1–20 carbon atoms;
  $R_3$ and $R_4$ is each a pyrrolidine-N radical.

2. Compound according to claim 1, wherein $R_1$, $R_2$, $R_5$, and $R_6$ is each an alkoxy group of 1–4 carbon atoms.

3. Compound according to claim 1, wherein said compound is 1-ethoxy-1,2-di-(N-pyrrolidyl)-[1,2-diphospha-cyclopentene-(5)-one-(4)]-tricarboxylic-acid-(3,3,5)-triethylester.

* * * * *